No. 658,334. Patented Sept. 25, 1900.
W. A. BALDWIN & T. JOHNSTON.
RIDING PLOW.
(Application filed Mar. 14, 1899.)
(No Model.) 6 Sheets—Sheet 5.
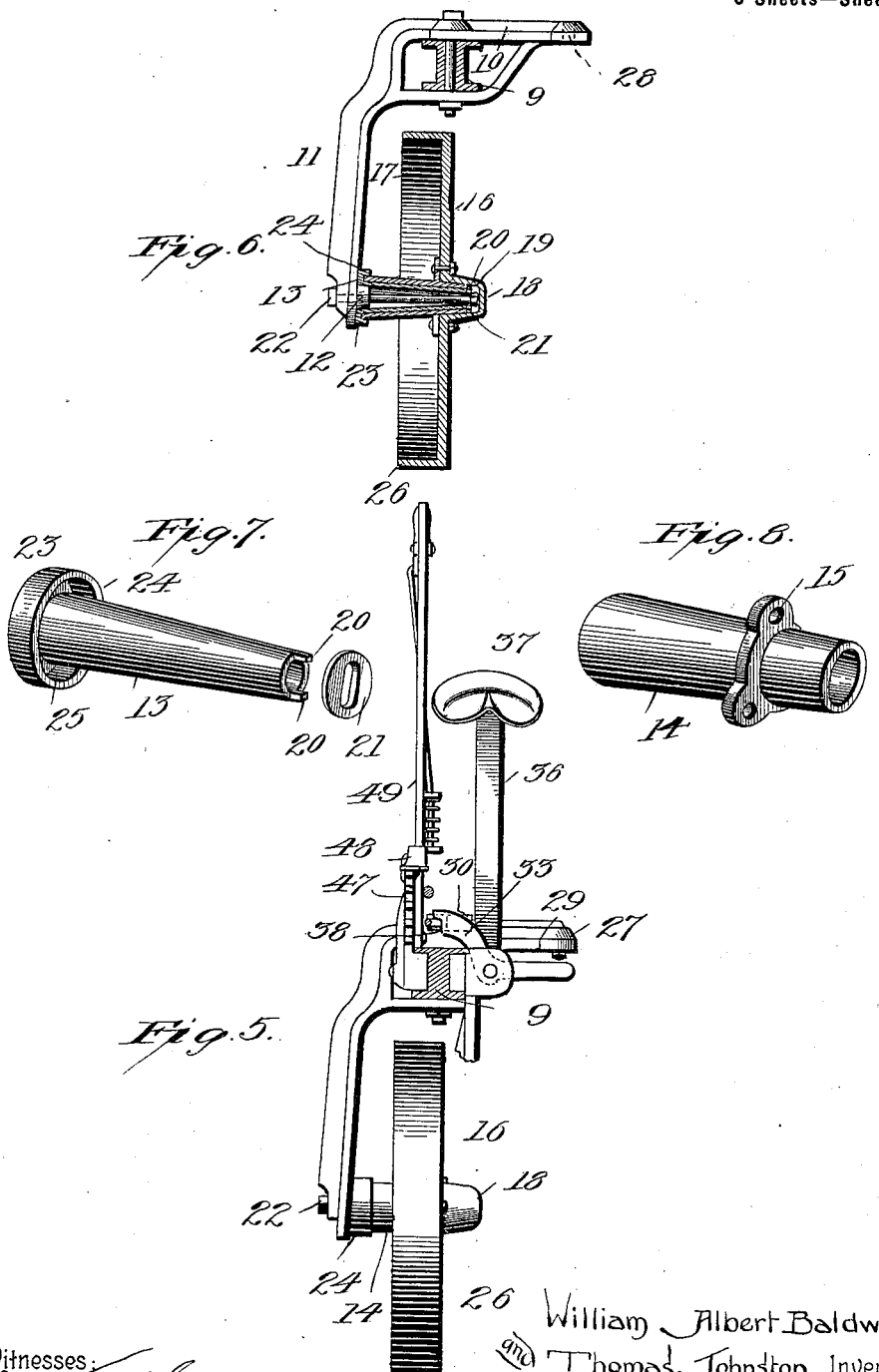

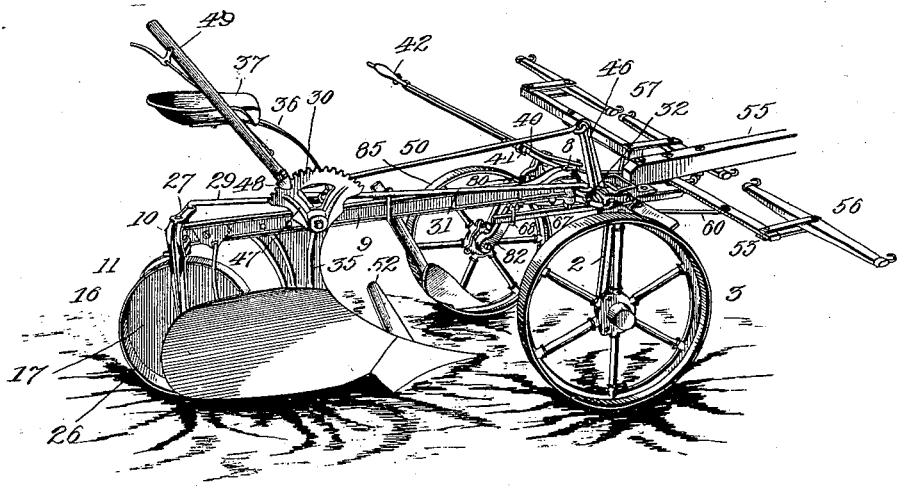

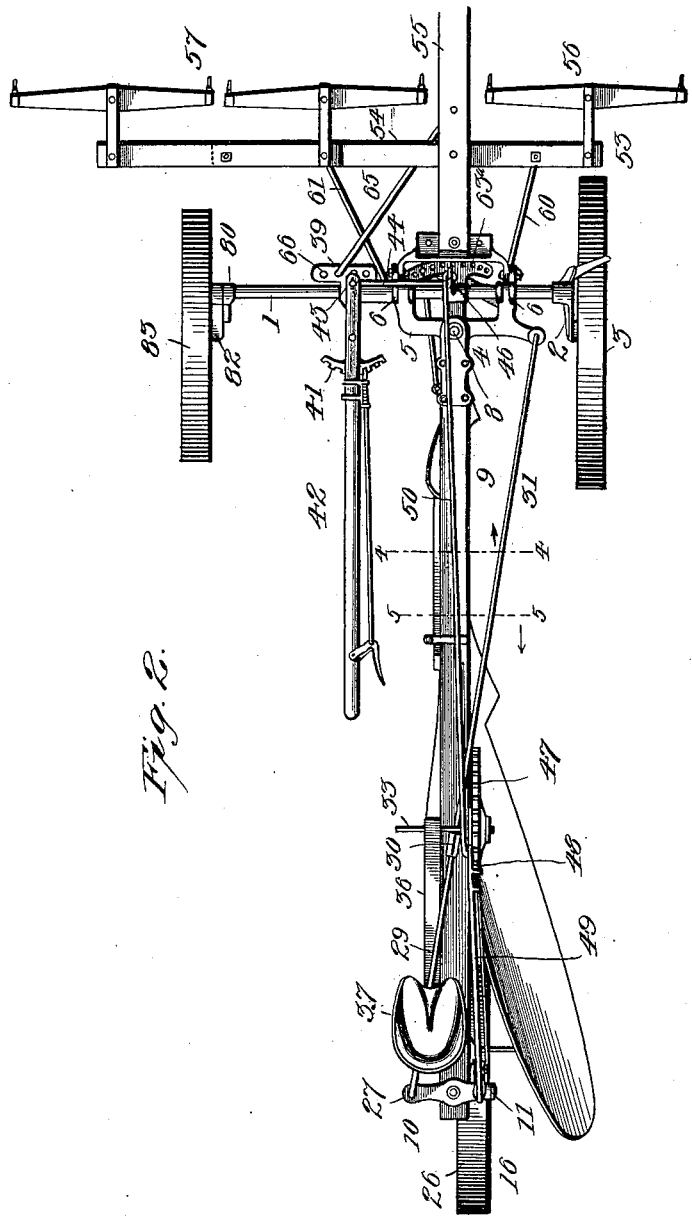

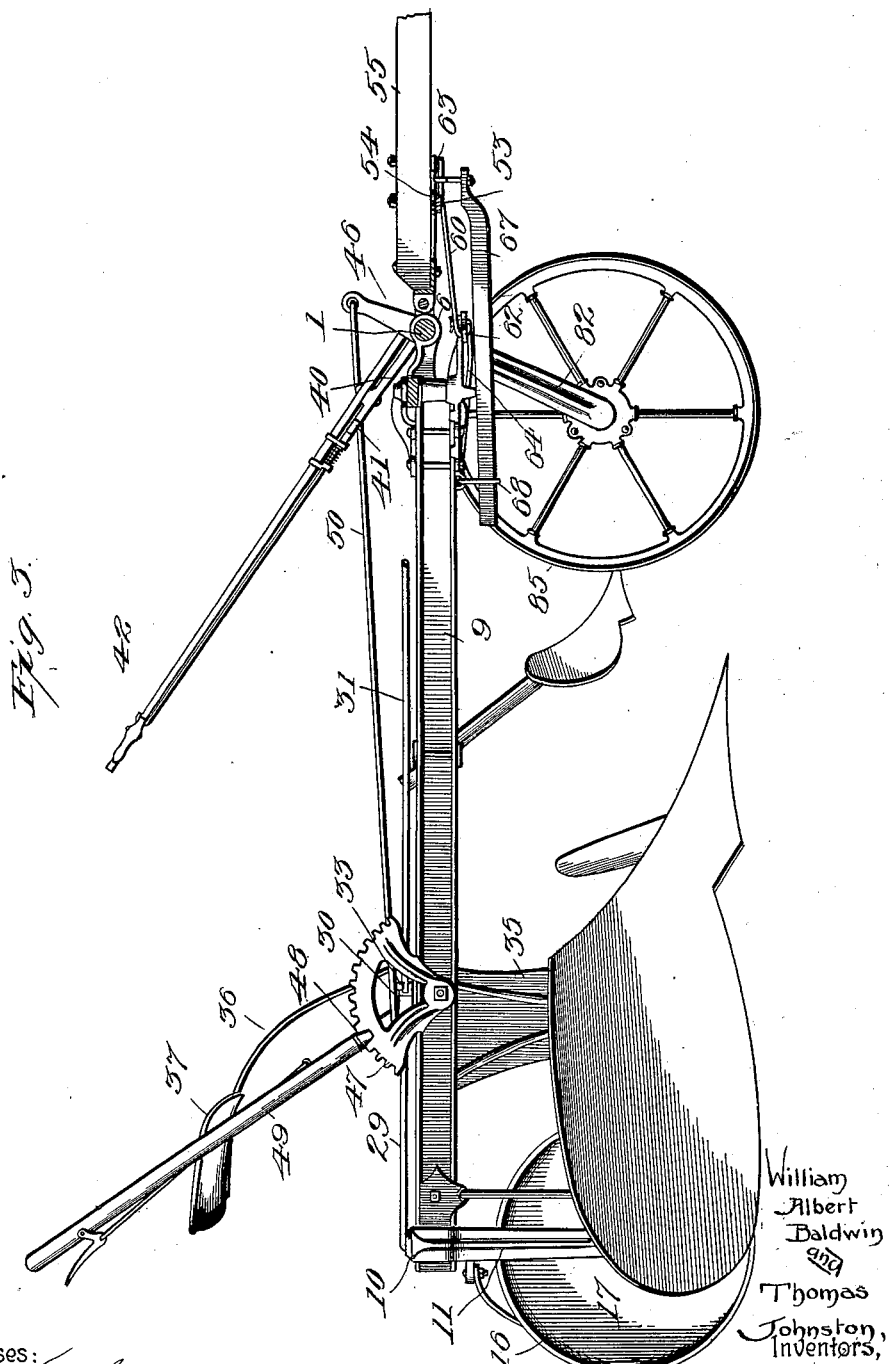

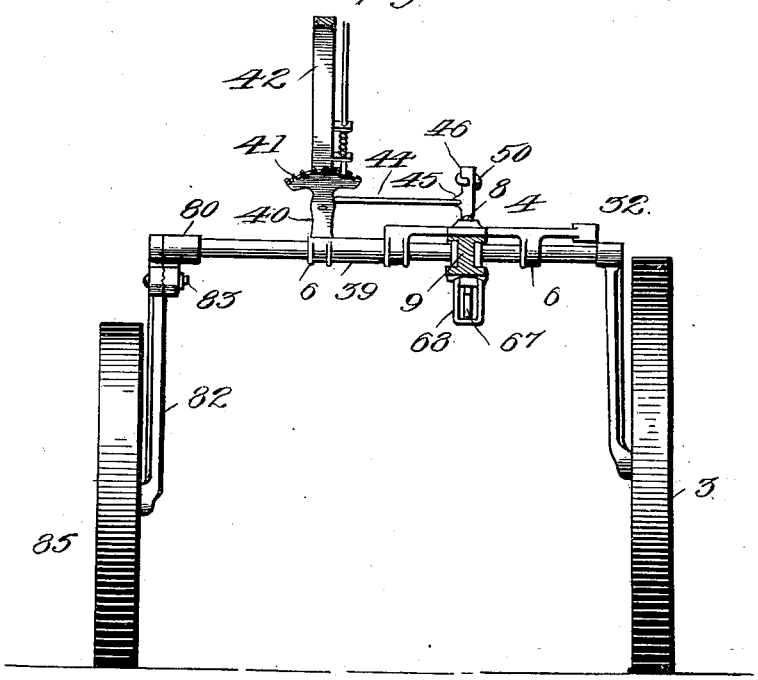
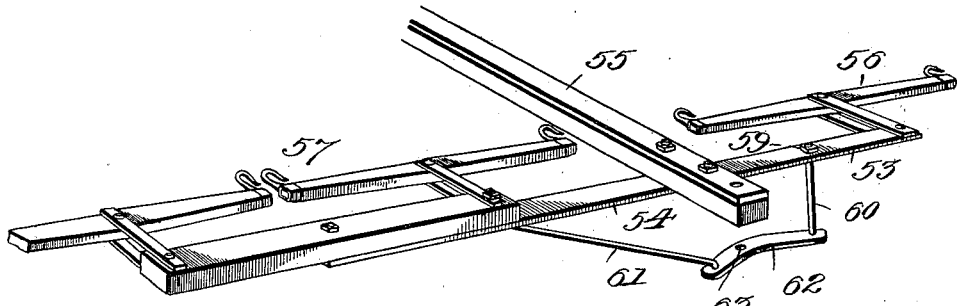
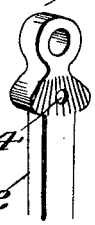

No. 658,334. Patented Sept. 25, 1900.
W. A. BALDWIN & T. JOHNSTON.
RIDING PLOW.
(Application filed Mar. 14, 1899.)
(No Model.) 6 Sheets—Sheet 6.
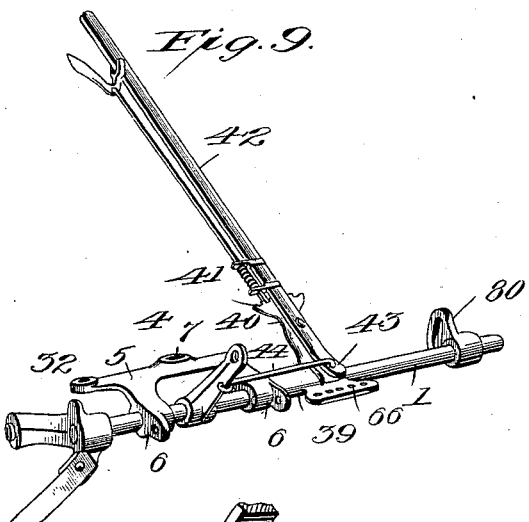
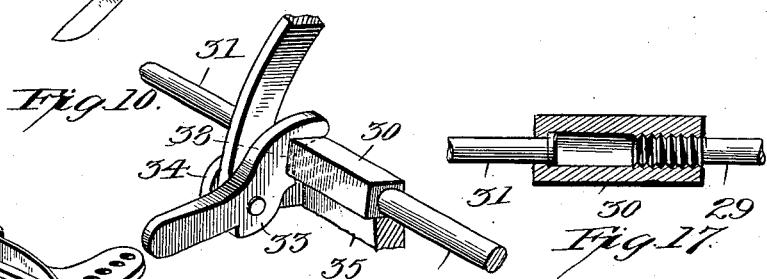
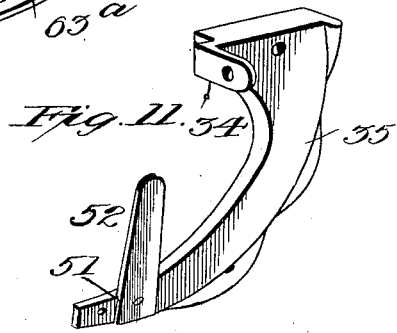
Witnesses:
William Albert Baldwin, and
Thomas Johnston, Inventors,
By Marion Marion
their Attorneys.

UNITED STATES PATENT OFFICE.

WILLIAM ALBERT BALDWIN, OF SMITH'S FALLS, AND THOMAS JOHNSTON, OF KEMPTVILLE, CANADA, ASSIGNORS TO JOHN R. LAVELL, OF SMITH'S FALLS, CANADA.

RIDING-PLOW.

SPECIFICATION forming part of Letters Patent No. 658,334, dated September 25, 1900.

Application filed March 14, 1899. Serial No. 709,108. (No model.)

*To all whom it may concern:*

Be it known that we, WILLIAM ALBERT BALDWIN, residing at Smith's Falls, county of Lanark, and THOMAS JOHNSTON, residing at Kemptville, county of Grenville, Province of Ontario, Canada, subjects of Her Majesty the Queen of Great Britain, have invented certain new and useful Improvements in Riding-Plows; and we do hereby declare the following to be a full, clear, and exact description of the invention, such as will enable others skilled in the art to which it appertains to make and use the same.

Our invention relates to improvements in riding-plows.

One object of our invention is to provide a plow of this class which is absolutely under the control of the driver, which can be readily adjusted to make a shallow or deep and narrow or wide furrow, which is neat and attractive in appearance, durable in construction, simple and efficient in operation, and which can be made at a moderate cost.

Another object is to provide a rolling landside which, in addition to performing the functions of the ordinary landside, serves as a guiding or steering wheel for the plow.

A further object is to provide mechanism for adjustably regulating the path of movement of the rolling landside.

A further object is to provide mechanism for automatically and adjustably regulating the path of movement of the rolling landside.

A further object is to provide mechanism for regulating the angle of the moldboard to turn the furrow over completely or partially.

A further object is to adjustably regulate the position of the plow-beam relative to the supporting-wheels, by means of which the furrow may be widened or narrowed.

A further object is to automatically move the plow to an adjustable position relative to the supporting-wheels.

A further object is to provide adjusting mechanism for adjustably regulating the position of the rolling landside and holding said landside in its adjusted position.

To these and other ends our invention consists in the improved construction and combination of parts hereinafter fully described, and particularly pointed out in the appended claims.

In the drawings forming a part of this specification, and in which similar numerals of reference indicate similar parts in all of the figures, Figure 1 is a perspective view of our improved plow. Fig. 2 is a top plan view. Fig. 3 is a side elevation, partly in section, showing the arrangement of the parts. Fig. 4 is a vertical sectional view taken on the line 4 4 of Fig. 2. Fig. 5 is a similar view taken on line 5 5 of Fig. 2. Fig. 6 is a vertical sectional view of the rolling landside and its support. Fig. 7 is a detail of the inner member of the bushing. Fig. 8 is a detail of the outer member. Fig. 9 is a detail view showing the axle and the sliding frame mounted thereon, together with the mechanism for moving the sliding frame. Fig. 10 is a detail of the adjusting mechanism and the locking-arm. Fig. 11 is a detail of the standard, showing the colter in position thereon. Fig. 12 is a detail of the whiffletree attachment. Fig. 13 is a top plan view of a portion of the front of the plow, showing the relative arrangement of parts. Fig. 14 is a sectional view taken on the line 14 14 of Fig. 13. Fig. 15 is a detail of the casting located on the under side of the beam, to which the yoke is attached. Fig. 16 is a similar view of the upper casting. Fig. 17 is a detail sectional view showing the manner of connecting the two rods forming the connection between the yoke and the rolling landside. Fig. 18 is a detail showing the arm on which the landside-wheel is mounted.

In using riding-plows several difficulties have been found, forming great disadvantages, which have been sufficient to cause such plows to become a somewhat undesired article. The principal cause of these difficulties has been the fact that the plow is not steady in its movement and when adjusted will not be held in such adjusted position positively. To remedy these difficulties and provide a construction in which the disadvantages are eliminated, we make use of a construction by means of which the plow is held fixedly in position, yet be capable of being adjustably moved, such movement being accomplished by the movement of the plow, which automatically seeks to pass to its adjusted position.

In order that the detailed description hereinafter given and the difficulties heretofore set forth may be more readily understood, we now give a general statement, which will illustrate the operation of this portion of the plow.

The plow is provided with an axle and wheels, on which is mounted a sliding carriage To this carriage the plow-beam is pivotally connected, the rear end of which is provided with a pivotally-mounted rolling landside, which serves to steer the plow. The carriage and landside-support are connected together by an adjustable rod, said rod extending at an angle to the plow-beam and passing over said beam at a point near its rear end. This rod is adjusted so that the landside will be held normally in a direction parallel with the direction of the wheels, being held in this position by a locking-arm, which prevents the rod from moving. When the plow is to be moved to increase or decrease the furrow, the operator moves the sliding carriage laterally in the proper direction, first releasing the locking-arm, the carriage carrying with it the front end of the beam. This movement of the carriage immediately rotates the landside by reason of the increasing or decreasing of the angle between the connecting-points of the rod, thus moving the landside at an angle to the direction of movement of the wheels, which retain their normal position. When the landside is so turned, it acts in a manner similar to a rudder, causing the rear end of the beam to move in a corresponding direction toward its normal position at right angles to the axle. As the rear end of the beam makes this movement the angle between the connecting-points of the adjustable rod becomes automatically changed, making a corresponding alteration of the direction of movement until the beam has reached its normal position, at which time the connecting-rod will be in its normal position and angle. In this manner the plow is moved to its new position without disturbing the position of the wheels, the movement being automatically regulated. After the movement the locking-arm is again placed in position and the landside held fixedly against any movement which would tend to move the plow toward the landside, which is the natural tendency by reason of the weight of the furrow turned up.

Another disadvantage arising in the use of this class of plows is that when the plow contacts with any foreign substance—such as roots or stones, &c.—the plow is thrown into the air, carrying with it the rider, who is oftentimes injured. In the present construction this is prevented by the use of a bar which is connected to the frame in front of the axle and has its rear portion mounted in a link suspended from the beam. Any tendency of movement of the plow upward to any extent is thus prevented by the construction of the supporting-casting, which prevents the rear end of the bar from rising.

Other advantages of construction and operation appear, but will be set forth in detail hereinafter.

1 designates the axle, having one of its ends provided with the downwardly-extending arm 2, the lower end of which is connected to the furrow-wheel 3. The wheel 3 is connected to the arm 2 in a manner similar to that shown in Fig. 6, in which figure the mounting of the rolling landside is shown. The opposite end of the axle is provided with a laterally-extending plate 80, having an elongated slot 81 and having its outer face corrugated in a radial direction, as shown in Fig. 18. An arm 82 is pivotally mounted on the end of the axle and extends rearwardly therefrom alongside the plate 80, being adjustably connected therewith by means of the bolt 83, passing through an opening 84, formed therein, the inner face of the arm 82 being provided with corrugations similar to the plate 80, the corrugated portion of the plate and arm being adapted to meet, and thus aid in retaining the arm in its adjusted position. To the free end of the arm 82 is secured the landside-wheel 85, connected to said arm in a manner similar to the movement of the wheel 3, the wheel 85 being of less diameter than the wheel 3, the arm 82 being consequently of greater length than the arm 2 in order that the axle may, if desired, be held in a true horizontal position. This construction is arranged in this manner in order that the moldboard may be adjusted to different angles, thereby causing the furrow to be turned over entirely or but partially, as may be desired, the desired inclination being obtained by moving the arm 82 on its pivot (the axle) until the wheel 85 passes to a point where the axle will have a proper inclination when both wheels are on the ground.

4 designates a carriage slidably mounted on the axle (said carriage being best shown in Fig. 9) and comprises the yoke 5, having bearings 6, which are loosely mounted on the axle 1. The yoke is provided with an opening 7, through which a pin 8 is passed, on which is pivotally mounted the front end of the beam 9. The rear end of the beam 9 is provided with a pivotally-mounted support 10, said support having a downwardly-extending portion 11, having at its lower end a collar 12 and adapted to receive one end of a collar 13, which extends laterally a suitable distance, said collar being adapted to pass within a peripheral collar 14, having a series of laterally-extending lugs 15, adapted to be secured to the rolling landside 16. The landside is formed substantially as shown in Fig. 6, comprising a circular disk 17, having its front face provided with an integral extension 18, having a recess 19, within which the collars 13 and 14 extend, the collar 13 having its front end provided with lugs 20, adapted to receive a washer 21, through which and the collar 13 and portion 11 is adapted to be passed a bolt 22, secured in position by the nut 23ª. The collar 13 is further provided with an annular flange 23, from which extends forwardly the flange 24, thus forming an annular recess 25 between the flange 24 and the outer periphery of the collar 13, within which the rear end of the collar 14 is adapted to fit. The landside is also provided at its periphery with a rearwardly-extending annular flange 26, which rests on the ground. By this construction it will be seen that an absolutely dirt-proof bushing is formed, the assembling of which is done as follows: The collar 14 is first placed in position on the collar 13, leaving the lugs 20 extending. The washer 21 is then placed over said lugs, thereby closing the front end of said collars, with the exception of a central opening, through which the bolt 22 is passed, carried through the collar 13 and the collar 12 of the portion 11, being secured in position by the nut 23. The landside is now passed into position and secured to the lugs 15 by suitable bolts.

The support 10 above the beam 9 is provided with an extension 27, having near its end an opening 28, adapted to receive the rear end of a forwardly-extending rod 29, the front end of which is adjustably mounted in a screw-threaded nut 30, pivotally secured on the rear end of a rod 31, the forward end of which is removably secured in an opening 32, formed in the yoke 5, at one side thereof, the openings 32 and 28 being located on opposite sides of the beam 1. By this construction it will be readily seen that the yoke 5 and support 10 are connected together by means of a rod which, while formed sectionally, the sections being adjustably connected, is for all purposes rigid, so that if the yoke 5 is held stationary the support 10 and the rolling landside which it carries will be held in a relatively-fixed position. The nut 30 allows of the adjustment of the position of the support to a nicety and also allows of a taking up of any wear which may result from use.

To hold the rod in its fixed position, we provide a locking-arm 33, pivotally connected to an ear 34, formed on the plow-standard 35, to which is also connected the supporting-arm 36 for the seat 37. The locking-arm 33 is formed with a recess 38, which is adapted to normally rest on the rod between the nut 30 and the arm 36. This will prevent the rod from moving forwardly, although the movement of the plow and pressure on the moldboard would tend to cause such forward movement.

The yoke 5 is provided with an extension 39, forming a continuous bearing on the axle 1 on the side opposite to the opening 32, said extension having a rearwardly-extending portion 40, having its rear end formed with a notched segment 41. The portion 40 is adapted to receive a rearwardly-extending lever 42, having a pawl adapted to normally rest in one of said notches, the front end of said lever being provided with an opening 43, adapted to receive one end of a connecting-rod 44, having its opposite end secured in an opening 45, formed in a standard 46, fixedly secured on the axle 1, intermediate the bearings 6. It will be readily seen that when the lever 42 is oscillated the carriage 4 will be moved on the axle in a corresponding direction, the point of connection of the rod 44 and the lever 42 forming the fulcrum. If the lever 42 is moved toward the right by the driver, the carriage 4 will be moved in a corresponding direction, carrying with it the front end of the beam 9, and thus changing the angle of the beam and of the rod connecting the yoke and the support 10. As hereinbefore explained, this changing of the angle of the rod will cause the end of the extension 10 to be moved forwardly, moving the rolling landside to a position in which the forward movement of the plow will cause the rear end of the beam to be carried to the right, this movement constantly changing the angle of the beam and automatically moving the end of the extension toward its normal position, which is reached when the beam 9 again reaches a position at right angles to the axle 1. A movement to the left of the carriage 4 causes the beam 9 to have a corresponding movement through the medium of the rolling landside.

As it is essential that the depth of the furrow be regulated, we provide the beam 9 with a suitable notched segment 47, which is adapted to coact with a pawl 48, formed on a pivotally-mounted lever 49, said lever being connected, by means of a suitable bar or rod 50, to the outer end of the standard 46. When it is desired to deepen the furrow, the lever 49 is moved forwardly, causing the axle 1 to rotate, said rotation causing the arms 2 to have a segmental movement, which movement allows the axle 1 to be lowered, which in turn allows the beam 9 to be lowered. A movement of the lever 49 in the opposite direction serves to raise the axle 1 in an obvious manner.

The standard 35 is of any preferred form, to which the moldboard and plow-point are secured.

As shown, no landside is needed, as the rolling landside accomplishes the same ends in addition to forming the guiding or steering wheel. This standard is provided with a suitable recess 51, within which is removably and adjustably secured the colter 52, extending upwardly therefrom at any desired angle and to any desired distance. While we have shown the colter as being secured to the standard, it is to be understood that such colter may also be secured to the moldboard or the ordinary landside when used, we claiming the principle of securing the colter to the furrow-making portion of the plow, broadly.

The draft-equalizer is best shown in Fig. 12 and comprises two plates 53 54, pivotally connected to the under side of the pole or tongue 55. To the outer end of the plate 53 the singletree 56 is secured, and to the outer end of the plate 54 is secured the doubletree 57, or a singletree if the equalizer is used for two horses. Suitable braces or connecting-rods may be connected to the pole and single and double trees parallel with the plates 53 54. The plates 53 and 54 are each provided centrally with openings 59, in which are removably secured rods 60 and 61, said rods having their free ends connected to the ends of an angular plate 62, said plate having an opening 63, adapted to receive the front end of a rod 64, the rear end of which is connected to the rear part of the under casting for the beam and having its front end, after passing up through opening 63, passed through one of the openings 63ª, formed in the front of the same casting, and being further braced by means of an angularly-extending rod 65, secured to the tongue and to the extension 39, said extension being provided with a number of openings 66, within any one of which a rod 65 may be placed, thus allowing of a ready adjustment of the parts.

It will be readily seen that when a forward pull is exerted on the double and single trees the pole or tongue will have a partial backward movement, which is of great advantage, as it steadies the plow in an obvious manner and tends to prevent the plow rising out of hard ground, and the pull on the rods 60 and 61 equalizes the draft on the horses.

To prevent the rear end of the plow from being thrown upwardly by coming in contact with roots, stones, &c., we have provided a bar 67, having its front end secured below the pole or tongue, said bar extending rearwardly below the axle 1 and having its rear end mounted within a link 68, suspended from the casting. (Shown in Fig. 15.) The link is of a sufficient length to allow of the movement of the beam; but a greater movement will be prevented by the bar 67 contacting with the under side of the projection 69, formed on the under side of the casting, as shown in said figure.

The operation is believed to have been clearly set forth, and is therefore not reiterated.

The advantages of this construction are obviously clear; but in addition to those heretofore set forth we call attention to the elimination of the landside of usual construction forming the follower-wheel in such manner as to cause it to act as follower and landside, and in this manner reducing the weight of the plow to a corresponding extent.

While we have herein shown a preferred form of carrying our invention into effect, yet we do not desire to limit ourselves to such preferred details of construction, but claim the right to use any and all modifications thereof which will serve to carry into effect the objects to be attained by this invention in so far as such modifications and changes may fall within the spirit and scope of our said invention.

Having thus described our invention, what we claim as new is—

1. A riding-plow comprising a wheeled axle; a beam adjustably connected thereto; means, carried by said axle for adjusting the position of said beam laterally on said axle, said beam retaining its normal angular alinement in each of its adjusted positions; and means for locking said beam against movement in one direction.

2. A riding-plow, comprising a wheeled axle; a plow-beam slidably mounted thereon, the normal position of said beam being at right angles to said axle; means for adjustably moving the front end of said beam on said axle, whereby the angle will be varied; and means, operated by the movement of said front end of the beam, for automatically steering the rear end of said beam to its normal position.

3. A riding-plow comprising a wheeled axle; a plow-beam slidably connected thereto, the normal position of said beam being at right angles to said axle; means for adjustably moving the front end of said beam on said axle, whereby the angle will be varied; means operated by the movement of said front end of the beam for automatically steering the rear end of said beam to its normal position; and means for locking said beam in its normal position against movement in one direction.

4. A riding-plow comprising a wheeled axle; a plow-beam slidably mounted thereon; means, including a lever and connections, for adjustably moving the front end of said plow-beam on said axle; and means for automatically moving the rear end of said beam to its adjusted position during the forward movement of the plow.

5. A riding-plow comprising a wheeled axle; a plow-beam slidably mounted thereon, the normal position of said beam being at right angles to said axle; means, including a lever and connections, for adjustably moving the front end of said beam on said axle, whereby the angle will be varied; and means for automatically moving the rear end of said beam to its normal position during the forward movement of the plow.

6. A riding-plow comprising a wheeled axle; a plow-beam slidably mounted thereon, the normal position of said beam being at right angles to said axle; means, including a lever and connections, for adjustably moving the front end of said beam on said axle, whereby the angle will be varied; and means, operated by the movement of said front end of the beam, for automatically steering the rear end of said beam to its normal position.

7. A riding-plow comprising a wheeled axle; a plow-beam slidably mounted thereon, the normal position of said beam being at right angles to said axle; means, including a lever and connections, for adjustably moving the front end of said beam on said axle, whereby the angle will be varied; means operated by the movement of said front end of the beam for automatically steering the rear end of said beam to its normal position; and means for locking said beam in its normal position against movement in one direction.

8. A riding-plow comprising a wheeled axle; a plow-beam adjustably mounted thereon;

and means, including a lever and connections, for adjusting the position of said beam laterally on said axle, said beam retaining its normal angular alinement in each of its adjusted positions.

9. A riding-plow comprising a wheeled axle; a carriage loosely mounted thereon and normally held in a relative fixed position; means for adjustably moving said carriage laterally on said axle, said carriage being held in its adjusted position; a plow-beam pivotally connected to said carriage; means for automatically moving the rear end of said plow to its proper position during the forward movement of the plow; and means for locking said beam against movement in one direction.

10. A riding-plow comprising a wheeled axle; a carriage loosely mounted thereon to have a sliding movement; means, including a lever and connections, for adjustably moving said carriage on said axle, said carriage being held in its adjusted position; and means for automatically moving the rear end of said plow-beam to its proper position during the forward movement of the plow.

11. A riding-plow comprising a wheeled axle; a carriage loosely mounted thereon to have a sliding movement; means, including a lever and connections, for adjustably moving said carriage on said axle, said carriage being held in its adjusted position; means for automatically moving the rear end of said beam to its proper position during the forward movement of the plow; and means for locking said beam against movement in one direction.

12. A riding-plow comprising a wheeled axle; a carriage slidably mounted thereon; a lever having one of its ends operatively connected to a stationary fulcrum-point on said axle, said lever serving to adjustably regulate the position of said carriage on said axle; a plow-beam pivotally connected to said carriage; and means for automatically moving the rear end of said beam to its proper position during the forward movement of the plow.

13. A riding-plow comprising a wheeled axle; a carriage slidably mounted thereon; a lever mounted on said carriage and having one of its ends operatively connected to a stationary fulcrum on said axle, said lever serving to adjustably regulate the position of said carriage on said axle; a plow-beam pivotally connected to said carriage; and means for automatically moving the rear end of said beam to its proper position during the forward movement of the plow.

14. A riding-plow comprising a wheeled axle; a carriage slidably mounted thereon; a lever mounted on said carriage and having one of its ends operatively connected to a stationary fulcrum on said axle, said lever serving to adjustably regulate the position of said carriage on said axle; a plow-beam pivotally connected to said carriage; means for automatically moving the rear end of said beam to its proper position during the forward movement of the plow; and means for locking said beam against movement in one direction.

15. A riding-plow comprising a wheeled axle; a carriage slidably mounted thereon; a stationary standard secured on said axle; a lever mounted on said carriage and having one of its ends operatively connected to said standard, for adjustably regulating the position of said carriage on said axle; a plow-beam pivotally connected to said carriage; and means for automatically moving the rear end of said beam to its proper position during the forward movement of the plow.

16. A riding-plow comprising a wheeled axle; a carriage slidably mounted thereon; a stationary standard secured on said axle; a lever mounted on said carriage and having one of its ends operatively connected to said standard for adjustably regulating the position of said carriage on said axle; a plow-beam pivotally connected to said carriage; means for automatically moving the rear end of said beam to its proper position during the forward movement of the plow; and means for locking said beam against movement in one direction.

17. A riding-plow comprising a wheeled axle; a carriage slidably and adjustably mounted thereon; a plow-beam pivotally connected to said carriage; a rolling landside pivotally connected to the rear end of said plow-beam; and a rod connected to said landside and to said carriage adapted to automatically adjust the pivotal movement of said rolling landside when said carriage is moved on said axle.

18. A riding-plow comprising a wheeled axle; a carriage slidably and adjustably mounted thereon; a plow-beam pivotally connected to said carriage; a rolling landside pivotally connected to the rear end of said beam; a rod connected to said carriage and to said plow-beam for automatically adjusting the position of the rear end of said beam relative to the front end; and means for locking said beam against movement in one direction.

19. A riding-plow comprising a wheeled axle; a carriage slidably and adjustably mounted thereon, said carriage having a lateral movement; a plow-beam pivotally connected to said carriage, said plow-beam being automatically held at an approximate right angle to said axle; a rolling landside pivotally connected to the rear end of said beam; means for adjustably moving said carriage on said axle, whereby the angle of the beam may be varied; and a rod connected to said carriage and to said landside for automatically adjusting the position of the rear end of said beam relative to its front end.

20. A riding-plow comprising a wheeled axle; a carriage slidably and adjustably mounted thereon, said carriage having a lateral movement; a plow-beam pivotally connected to said carriage, said beam being automatically held at an approximate right angle to said axle; a rolling landside pivotally connected to the rear end of said beam; means for adjustably moving said carriage on said axle, whereby the angle of said beam will be varied; a rod connected to said carriage and said landside for automatically adjusting the position of the rear end of said beam relative to its front end; and means for locking said beam against movement in one direction.

21. A riding-plow comprising a wheeled axle; a plow-beam pivotally and slidably connected thereto; a rolling landside pivotally connected to said beam for automatically regulating the position of said beam relative to the axle; means for automatically moving said landside on its pivot; and means for locking said landside against pivotal movement in one direction.

22. A riding-plow comprising a wheeled axle; a plow-beam pivotally and slidably connected thereto; a rolling landside pivotally connected to said beam, said landside automatically regulating the position of the beam relative to the axle; means for automatically moving said landside on its pivot; and means for locking said landside against pivotal movement in one direction, said landside being free to move in the opposite direction.

23. A riding-plow comprising a wheeled axle; a plow-beam pivotally and slidably connected thereto; means for imparting an adjustable rotary movement to said axle, whereby the depth of the furrow may be regulated; and means for adjusting the position of the beam laterally on said axle said beam retaining its normal angular alinement in each of its adjusted positions.

24. A riding-plow comprising a wheeled axle; a plow-beam pivotally and slidably connected thereto; means for imparting an adjustable rotary movement to said axle to regulate the depth of the furrow; and independent means for adjusting the position of the beam laterally on said axle said beam retaining its normal angular alinement in each of its adjusted positions.

25. A riding-plow comprising a wheeled axle; a plow-beam pivotally and slidably connected thereto; means for imparting an adjustable rotary movement to said axle to regulate the depth of the furrow; independent means for adjusting the position of the beam laterally on said axle, said beam retaining its normal angular alinement in each of its adjusted positions; and means for locking said beam against movement in one direction.

26. A riding-plow comprising a wheeled axle; a plow-beam slidably and adjustably mounted thereon; means for imparting an adjustable rotary movement to said axle to regulate the depth of the furrow; and means for adjustably moving the position laterally of said beam on said axle and retaining its normal angular alinement in each of its adjusted positions, whereby the distance between the furrow-wheel and the line of the furrow may be varied regardless of the vertical position of the plow.

In witness whereof we have hereunto set our hands in the presence of two witnesses.

WILLIAM ALBERT BALDWIN.
THOMAS JOHNSTON.

Witnesses:
WILLIAM SANDERSON JOHNSTON,
HARRY ANSON LAVELL.